Patented Aug. 5, 1947

2,424,996

UNITED STATES PATENT OFFICE 2,424,996

PRESSURE-SENSITIVE ADHESIVE TAPES

Vion Neilan Morris, Highland Park, N. J., assignor to Industrial Tape Corporation, North Brunswick, N. J., a corporation of New Jersey No Drawing. Application July 15, 1942,
Serial No. 451,090

7 Claims. (Cl. 117—80)

1

This invention relates to primers or primer coatings, particularly suitable for pressure-sensitive adhesive tapes and more especially those employing a paper backing consisting of paper impregnated with a glue-glycerine-formaldehyde impregnant.

It is generally recognized that in adhesive tapes of this type it is difficult to provide a satisfactory bond between the adhesive coating and the glue-glycerine bonded backing, particularly in those instances in which the adhesives have a very strong attraction for the surface to which they are applied. Under high humidity conditions this difficulty is aggravated and in many instances the adhesive mass separates from the backing and remains or deposits upon the surface to which the adhesive is applied.

Primers as are now known are for the most part applied as solutions or dispersions, frequently a reclaimed rubber or crude rubber highly plasticized with resin, in an organic solvent. Primers of this type function by virtue of their highly sticky nature and should be applied in very thin films. A comparatively large amount of solvent is required which adds considerably to the cost of the primer and to the cost of the finished tape.

Furthermore, during ageing of tapes there is a tendency toward migration of the resin plasticizers from the primers into the adhesive compositions with a resulting decrease in priming or anchoring action.

Applicant has discovered that a hydrophobic material, if formed into a water dispersion, is capable of forming a satisfactory bond between a hydrophilic material, such as a glue-glycerine bonded fibrous or paper backing, and a hydrophobic material such as an adhesive mass. That is, such a primer will have a special affinity for both the hydrophilic backing during the period the primer is applied to the backing and the hydrophobic adhesive composition which is ordinarily appplied thereafter, both affinities being greater than the adhesion of the adhesive mass to the surface to which it is to be applied. This is particularly true of water dispersions of reclaimed rubber which for the purpose may be considered as dispersions of vulcanized rubber compounds. Such dispersed material, although classified as hydrophobic, is unexpectedly suitable for such purposes; that is, such a dispersion meets the requirement by forming a bond between both a hydrophilic material and a hydrophobic material. The bond formed by a water dispersion of reclaimed rubber is particularly effective as a primer between such materials as a glue-glycerine

2 bonded paper backing and a pressure-sensitive adhesive mass.

It is believed that this affinity may be aided by, if not attributed to the fact that after drying of the primer coating the individual particles of the reclaimed rubber are held in place by forces of adsorption or perhaps more or less mechanically by the glue film on the backing. In other words, it is believed that the relatively strong bond between the glue and the primer is produced first by the dispersed particles of hydrophobic material having special affinity for the glue surface where a glue-glycerine backing is used and that the individual spaced particles as distinguished from a film coating are mechanically held in the glue surface. The primed sheet thus presents a surface coated with spaced particles of reclaimed rubber to which the subsequently applied adhesive mass tenaciously adheres. On the other hand it is quite possible that the effectiveness of an aqueous dispersion of reclaimed rubber as a primer is due to two factors; viz., (1) the presence of a layer of hydrophilic material surrounding each dispersed particle while it is wet, and (2) the complete or partial removal of this layer, due to breaking of the emulsion or dispersion, during the process of drying. The first of these factors accounts for the affinity of the dispersed particles for the hydrophilic backing, the second explains the affinity of the dried film of primer for the subsequently applied, hydrophobic adhesive mass.

One reclaimed rubber dispersion particularly adapted for this purpose is known as "Syntex," the product of the Flintkote Company. This material is an aqueous reclaimed rubber dispersion of approximately 42% solids.

It has been found practical to dilute the aqueous reclaimed rubber dispersion for primer purposes to as low as 10% solids, although the more desirable range appears to be 15% to 20% solids.

It has also been found satisfactory to add a little glue to an aqueous dispersion of reclaimed rubber.

Another satisfactory composition is a mixture of aqueous reclaimed rubber dispersion and a suitable tackifying resin dispersion the latter being used as an extender of the reclaimed rubber. For example, 10 parts of reclaimed rubber dispersion, 5 parts of resin dispersion or 9 parts of reclaimed rubber dispersion, and 10 parts of resin dispersion.

It has been found satisfactory to apply the primer coating with the tanning agents for the glue as one step in the preparation of the impregnated backing. Aqueous dispersions embodying this invention can be utilized in this manner whereas primers as previously known can not be so applied. On the other hand, the primer coating can be knife-spread after the backing has been treated and dried. If the primer is to be applied during the application of a tanning agent, the primer coating can be as follows:

| | Parts |
|---|---|
| Reclaimed rubber dispersion | 10 |
| Resin dispersion | 5 |
| Formalin | 1 |
| Water | 4 |

In the foregoing rubber-resin dispersion mixtures the ingredients can be dispersed separately or the resin and reclaimed rubber may be mixed together prior to dispersing.

The foregoing mixtures all provide a primer that is particularly suitable for pressure-sensitive adhesive tapes using proteinaceous bonded paper backings such as glue-glycerine impregnated paper backings, although the primer is also suitable for other backings of hydrophilic nature in that it anchors the adhesive layer to the tape backing more strongly than the adhesive mass would adhere to any other surface.

The foregoing dispersions or primers have the advantage of being economical while producing strong bonds between the backing and adhesive. Obviously minor changes may be made in the proportions given without departing from the spirit and scope of the invention as defined in the claims appended hereto.

I claim:

1. A pressure-sensitive adhesive tape having a paper backing impregnated with a hydrophilic proteinaceous impregnant, a hydrophobic pressure-sensitive adhesive mass on one side of said backing, and a priming coat between said backing and said adhesive mass, said priming coat comprising particles of hydrophobic vulcanized rubber derived from an aqueous dispersion of a vulcanized rubber and adhering to and having an affinity for both the impregnated hydrophilic backing and the hydrophobic adhesive mass.

2. A pressure-sensitive adhesive tape having a paper backing impregnated with a hydrophilic proteinaceous impregnant, a hydrophobic pressure-sensitive adhesive mass on one side of said backing, and a priming coat between said backing and said adhesive mass, said priming coat comprising particles of hydrophobic vulcanized rubber having an affinity for both the hydrophobic adhesive mass and the impregnated hydrophilic backing, said rubber particles being derived from an aqueous dispersion of a reclaimed rubber having a solids content of substantially 10% to 20%.

3. A pressure-sensitive adhesive tape having a paper backing impregnated with a hydrophilic proteinaceous impregnant, said backing being tanned on one surface, a hydrophobic pressure-sensitive adhesive mass united to said backing on said tanned surface, and a priming coat between said backing and said adhesive mass, said priming coat comprising particles of hydrophobic vulcanized rubber derived from an aqueous dispersion of a reclaimed rubber, said priming coat having an affinity for both the hydrophobic adhesive mass and the hydrophilic impregnated fibrous paper backing of said pressure-sensitive adhesive tape.

4. In the process of uniting a hydrophobic pressure-sensitive adhesive to a fibrous backing impregnated with a hydrophilic impregnant, the step of coating said backing with an aqueous dispersion of a vulcanized rubber to anchor said hydrophobic pressure-sensitive adhesive to the fibrous impregnated backing.

5. In the process of uniting a hydrophobic pressure-sensitive adhesive to a fibrous backing impregnated with a hydrophilic proteinaceous impregnant, the step of coating said backing with an aqueous dispersion of vulcanized rubber particles to anchor said hydrophobic pressure-sensitive adhesive to the fibrous backing.

6. In the process of uniting a hydrophobic pressure-sensitive adhesive to a fibrous backing impregnated with a proteinaceous impregnant, the step of coating said backing with an aqueous dispersion of vulcanized rubber particles, said dispersion containing a small amount of glue to anchor said hydrophobic pressure-sensitive adhesive to said backing.

7. In the process of uniting a hydrophobic pressure-sensitive adhesive to a fibrous backing impregnated with a proteinaceous impregnant, the step of coating said backing with an aqueous dispersion of vulcanized rubber particles, said dispersion containing formalin to anchor said hydrophobic pressure-sensitive adhesive to said backing and simultaneously insolubilize the proteinaceous impregnant.

VLON NEILAN MORRIS.

REFERENCES CITED

The following references are of record in the file of this patent:

UNITED STATES PATENTS

| Number | Name | Date |
|---|---|---|
| 2,236,567 | Drew | Apr. 1, 1941 |
| 2,261,167 | Devin | Nov. 4, 1941 |
| 1,498,387 | Kirschbraun | June 17, 1924 |
| 1,735,547 | Reel et al. | Nov. 12, 1929 |
| 1,749,607 | Rose et al. | Mar. 4, 1930 |
| 1,941,437 | Jordan | Dec. 26, 1933 |
| 2,033,276 | Clark et al. | Mar. 10, 1936 |
| 2,227,444 | Drew (2) | Jan. 7, 1941 |
| 1,238,906 | Fuerth | Sept. 4, 1917 |
| 2,027,322 | Rice | Jan. 7, 1936 |
| 2,251,273 | Drew (3) | Aug. 5, 1941 |
| 2,340,298 | Billings | Feb. 1, 1944 |